V. SENCE.
ELECTRIC BELT.
APPLICATION FILED JUNE 25, 1912.

1,211,492.

Patented Jan. 9, 1917.
3 SHEETS—SHEET 1.

V. SENCE.
ELECTRIC BELT.
APPLICATION FILED JUNE 25, 1912.
1,211,492.
Patented Jan. 9, 1917.
3 SHEETS—SHEET 2.
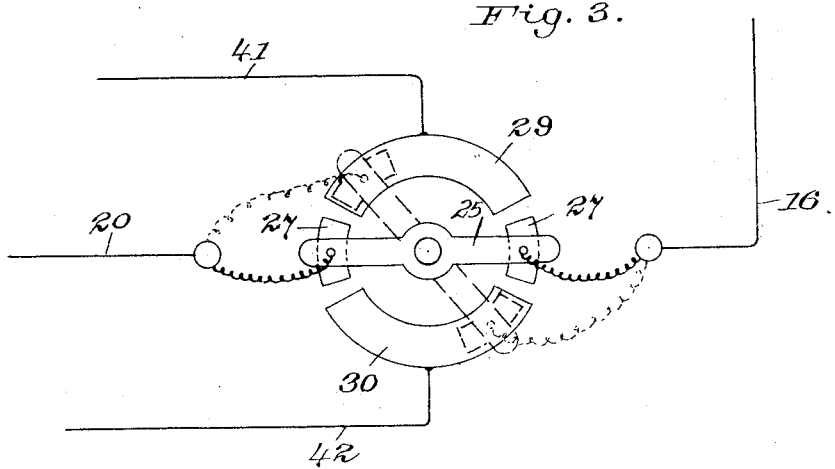
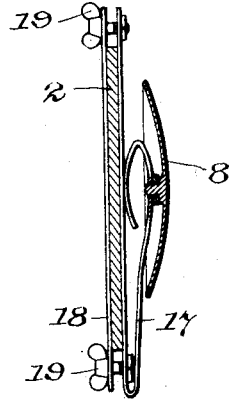
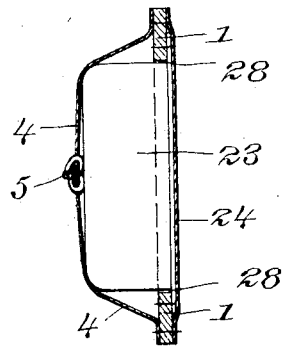
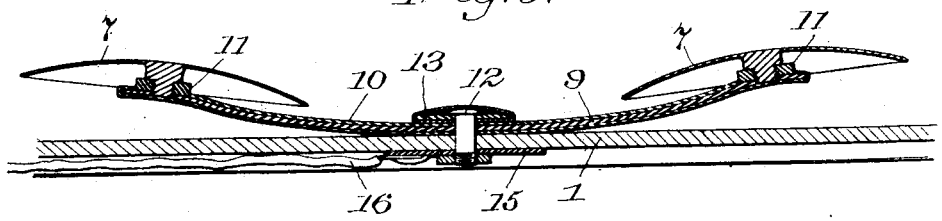
Witnesses:
C. W. Jewell
M. G. Crawford
Inventor
Victor Sence
By his Attorney

V. SENCE.
ELECTRIC BELT.
APPLICATION FILED JUNE 25, 1912.

1,211,492.

Patented Jan. 9, 1917.
3 SHEETS—SHEET 3.

Witnesses:
Inventor
Victor Sence
By his Attorney

UNITED STATES PATENT OFFICE.

VICTOR SENCE, OF NEW YORK, N. Y.

ELECTRIC BELT.

1,211,492.　　　Specification of Letters Patent.　　Patented Jan. 9, 1917.

Application filed June 25, 1912. Serial No. 705,821.

*To all whom it may concern:*

Be it known that I, VICTOR SENCE, a citizen of the United States of America, residing at New York city, borough of Manhattan, county and State of New York, have invented certain new and useful Improvements in Electric Belts, of which the following is a specification.

My invention relates to belts designed to be worn on the body of a patient, generating an electric current and transmitting the same through the patient's body, and to a mechanical current generator for use thereon. The belts heretofore produced for this purpose have employed primary or storage batteries for generating such current. These are cumbersome and uncertain in action and the current generated by them is weak. I have invented a therapeutic device comprising a belt provided with a small portable spring driven electric generator which can be conveniently carried thereon and which, when wound up, will run for ten or fifteen minutes and generate a current of considerable tension and quantity.

Figure 1:
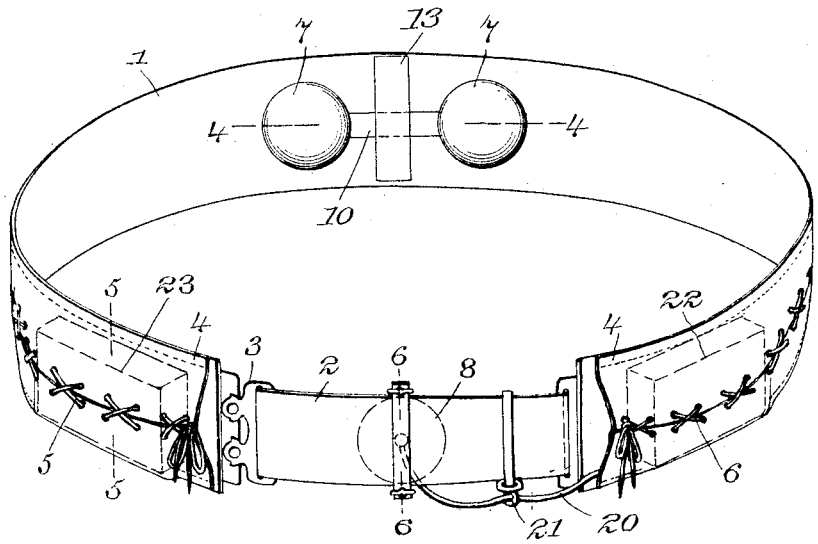
Figure 2:
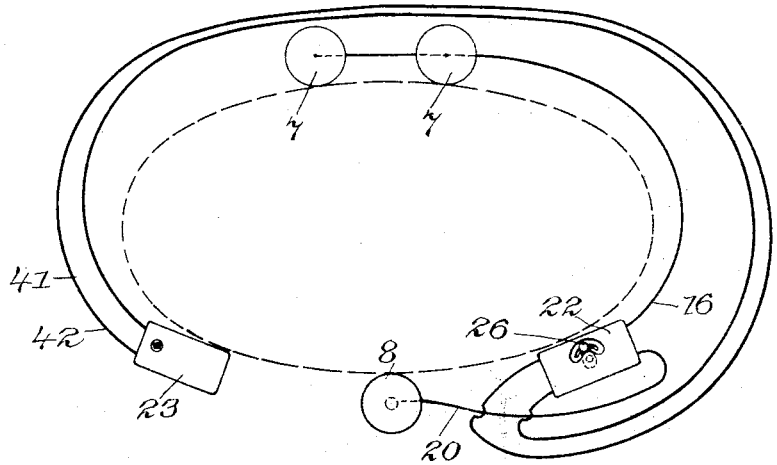
Figure 7:
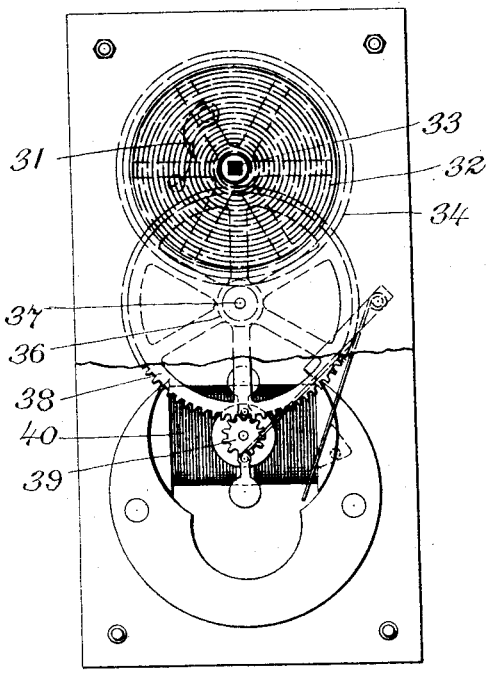
Figure 8:
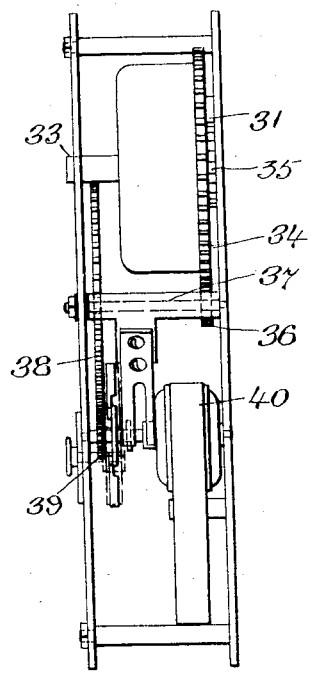
Figure 9:
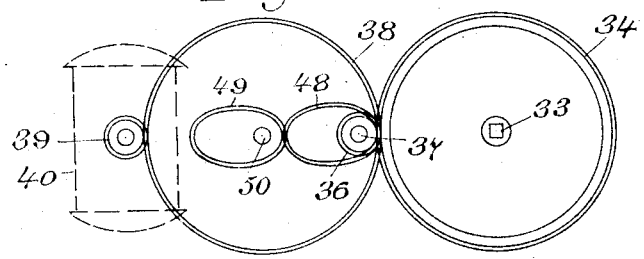

The best form of apparatus embodying my invention, and one modification thereof, are illustrated in the accompanying three sheets of drawings in which, Figure 1 is a perspective view of the belt. Fig. 2 is a diagram of the electric circuits. Fig. 3 is an enlarged diagram of the circuit reversing switch. Fig. 4 is an enlarged cross section on line 6—6 of Fig. 1. Fig. 5 is a similar cross section in line 5—5 of Fig. 1. Fig. 6 is an enlarged detail cross section on line 4—4 of Fig. 1. Fig. 7 is a plan view of the generator with part of the top plate broken away. Fig. 8 is a side view of the same, and Fig. 9 is a diagram of a modified generator driving gear.

Throughout the drawings like reference characters indicate like parts.

The belt consists of a non-elastic section 1, and a shorter elastic section 2, with any convenient form of connecting clasp 3. A silk outer covering 4 is slit longitudinally and the two portions connected by lacings 5 and 6, or convenient means. Near one end of the non-elastic section 1 under silk cover 4 is a switch box 22, and near the other end is a generator box 23.

The electrical contacts and connections are as follows: 7, 7, are two metal disks forming contacts designed to press on the patient's back. 8 is a similar disk, preferably carried by the elastic section 2, designed to press on the patient's abdomen. As shown, disks 7, 7, are carried on spring strip 9, covered with kid or other non-conducting covering 10. A convenient method of mounting the disks is by having threaded hubs screw into nuts 11, fastened on strip 9. This strip is held to the belt by bars 13 and 15 held together by bolt 12, and having strip 9, and belt section 1 clamped together between them. 16 is a wire or other conductor running from plate 15 to one of the contacts 27, on switch lever 25 (see Fig. 3) which is of non-conducting material. Disk 8 is preferably supported on a bent strip of spring metal 17 which is clamped to bar 18, by thumb nuts 19, 19, so as to clasp the elastic belt section 2 between them. This renders the disk 8 adjustable on belt section 2. A wire 20 extends to the other contact 27 on switch lever 25, and is supported midway of its length at 21. The switch contact plate 29 is connected by wire 41 to one pole of the generator 40, and contact plate 30 is connected by wire 42 to the other pole. These wires 41 and 42 are shown in diagram (Fig. 2) running along the belt around the body of the patient under the belt covering and so do not show in Fig. 1. The switch lever 25 may be manipulated by any convenient form of handle on the outside of the casing as indicated at 26 in Fig. 2.

The current generator is preferably of the type described in my application Serial No. 697,136, filed May 14, 1912, now Patent No. 1,052,522 though other forms of magneto-generator might be used. As shown in Figs. 7 and 8 the generator 40 is driven by pinion 39 on its armature shaft which meshes with gear 38 on shaft 37, which also carries pinion 36 driven by gear 34 on arbor 33 to which the coiled spring 32 is attached. Arbor 33 and gear 34 are connected by pawl 31 and ratchet 35.

Preferably the belt section 1 is cut away as indicated at 28 (Fig. 5) to receive the generator and switch casings, and the inner belt lining 24 retains the casings in place.

In operation the switch is turned into a position such as is shown in dotted lines Fig. 3, so that its contacts 27, 27, bear on plates 29 and 30, and the spring arbor 33 is turned, by a key grasping its squared end, in a direction to wind up the spring 32 and cause ratchet teeth 35 to slip under pawl 31, the belt being in position on the patient's body.

Access to the arbor 33 is had by partly unlacing the cover 4 over the generator casing. As the spring unwinds it rotates the generator 40 and current passes from one pole through wire 41, contact plate 29, one contact 27 and wire 20 to disk 8, through the patient's body to the other contact disks, 7, 7, and back by wire 16, one of the contacts 27, contact plate 30, wire 42 to the other pole of the generator. The spring motor will run for about 15 minutes and the current can be reversed from time to time in its direction of flow through the patient's body by reversing the switch lever. When the switch is in the position shown in full lines in Fig. 3, the circuits are open.

A greater effect is produced by the current if it varies from time to time in force as well as in direction and to produce that variation I may use a variable speed driving gear, such as is indicated in outline in Fig. 9, where the spring driven gear 34 meshes with pinion 36 on shaft 37, as before, but shaft 37 carries an elliptical gear 48 which meshes with a second elliptical gear 49 on shaft 50, on which is fastened gear 38 meshing with pinion 39 on generator 40. The interposition of eliptical gears 48 and 49 and shaft 50, between shaft 37 and gear 38 changes the uniform rotation of shaft 37 to a variable speed rotation in shaft 50 which is transmitted by gear 38 to the generator.

Having, therefore, described my invention, I claim:

1. A therapeutic device comprising a belt adapted to be worn about the human body having attached thereto a rotary generator of electricity, a spring motor geared to said generator, contact plates adapted to press on the body of the wearer, and connections from said plates to the poles of the generator, together with a train of variable speed gearing inserted between the motor and the generator, said gearing comprising a pair of intermeshing elliptical gear wheels.

2. An electric therapeutic device comprising a rotary generator of electricity, body contacts in the generator circuit, a motor, and gearing connecting the motor and the generator adapted to rotate the generator at varying speeds during a given period of uniform rotation of the motor.

VICTOR SENCE.

Witnesses:
A. PARKER-SMITH,
M. G. CRAWFORD.

Copies of this patent may be obtained for five cents each, by addressing the "Commissioner of Patents, Washington, D. C."